(12) United States Patent
Thomas et al.

(10) Patent No.: US 10,397,326 B2
(45) Date of Patent: Aug. 27, 2019

(54) IRC-INFOID DATA STANDARDIZATION FOR USE IN A PLURALITY OF MOBILE APPLICATIONS

(71) Applicant: Sprinklr, Inc., New York, NY (US)

(72) Inventors: Ragy Thomas, New York, NY (US); Jared Alessandroni, New York, NY (US)

(73) Assignee: SPRINKLR, INC., New York, NY (US)

( * ) Notice: Subject to any disclaimer, the term of this patent is extended or adjusted under 35 U.S.C. 154(b) by 320 days.

(21) Appl. No.: 15/403,861

(22) Filed: Jan. 11, 2017

(65) Prior Publication Data

US 2018/0198860 A1  Jul. 12, 2018

(51) Int. Cl.
- H04L 29/08 (2006.01)
- H04L 29/06 (2006.01)
- G06F 16/00 (2019.01)

(52) U.S. Cl.
CPC .......... *H04L 67/1097* (2013.01); *G06F 16/00* (2019.01); *H04L 63/00* (2013.01); *H04L 67/306* (2013.01); *H04L 67/02* (2013.01)

(58) Field of Classification Search
CPC ........ H04L 67/02; H04L 67/306; H04L 63/00
(Continued)

(56) References Cited

U.S. PATENT DOCUMENTS 6,049,829 A    4/2000 Li
6,601,234 B1   7/2003 Bowman-Amuah
(Continued)

FOREIGN PATENT DOCUMENTS

EP    2698955 A1   2/2014
WO    2010008685   1/2010
(Continued)

OTHER PUBLICATIONS

Christl et al., Using Mobile Technology for Inter-Organisational Collaboration and End-Customer Integration, ACM, 2013, pp. 1-8.
(Continued)

*Primary Examiner* — Minh Chau Nguyen
(74) *Attorney, Agent, or Firm* — Jennifer Hayes; Nixon Peabody LLP

(57) ABSTRACT

An object-oriented data management method and system comprising nested structural-elements that form inter-related containers of IRC-Infoids that include information, processing-rules, and an atomic-action layer, enabling functions to operate across disparate-systems using self-normalizing data-definitions is disclosed. The creation and management of the IRC-Infoid objects, rules and actions are handled by an IRC-Infoid Engine. The IRC-Infoid is an object with its own definitions, properties, and rules, related to a single parent element. Six properties define the IRC-Infoid: event, user, file, message, data and relationship. These properties follow inter-relationship rules, which force internal consistency, data optimization, and maintain data integrity. The IRC-Infoid data structure includes documentation, thought leadership and chatter, which when parsed through the rule sets, gets attached to standard or triggered actions, including periodic updates and called actions for use across disparate systems.

11 Claims, 5 Drawing Sheets

(58) Field of Classification Search
USPC .......................................................... 709/223
See application file for complete search history.

(56) References Cited

U.S. PATENT DOCUMENTS

| | | | |
|---|---|---|---|
| 7,308,418 B2 | 12/2007 | Malek et al. | |
| 7,761,848 B1 | 7/2010 | Chaffin | |
| 7,930,302 B2 | 4/2011 | Bandaru et al. | |
| 8,225,271 B2 | 7/2012 | Eldridge et al. | |
| 8,266,148 B2 | 9/2012 | Guha et al. | |
| 8,584,082 B2 | 11/2013 | Baird et al. | |
| 8,635,281 B2 | 1/2014 | Kelly | |
| 8,645,912 B2 | 2/2014 | Welchman et al. | |
| 8,683,433 B2 | 3/2014 | Nayak et al. | |
| 8,688,726 B2 | 4/2014 | Mahajan et al. | |
| 8,694,520 B1 | 4/2014 | Krishnakumar et al. | |
| 8,707,259 B2 | 4/2014 | Trofin et al. | |
| 8,732,669 B2 | 5/2014 | Valdiviezo et al. | |
| 8,819,659 B2 | 8/2014 | Ramer et al. | |
| 8,832,644 B2 | 9/2014 | Hirsch | |
| 8,924,914 B2 | 12/2014 | Boeckenhauer et al. | |
| 8,978,006 B2 | 3/2015 | Hirsch | |
| 8,996,371 B2 | 3/2015 | Hurvitz et al. | |
| 9,002,892 B2 | 4/2015 | Benyamin et al. | |
| 9,116,983 B2 | 8/2015 | Ameri-Yahia et al. | |
| 9,223,831 B2 | 12/2015 | Baker et al. | |
| 9,448,776 B1 | 9/2016 | Sankaran | |
| 9,672,032 B2 | 6/2017 | Zhou | |
| 9,696,967 B2 | 7/2017 | Balasubramanian | |
| 10,073,794 B2 | 9/2018 | Thomas et al. | |
| 10,095,686 B2 | 10/2018 | Zhang | |
| 2001/0027472 A1* | 10/2001 | Guan | H04W 4/00 709/203 |
| 2006/0053156 A1 | 3/2006 | Kaushansky et al. | |
| 2007/0050446 A1* | 3/2007 | Moore | G06F 8/36 709/203 |
| 2007/0174255 A1 | 7/2007 | Sravanapudi | |
| 2008/0249764 A1 | 10/2008 | Huang et al. | |
| 2009/0319342 A1 | 12/2009 | Shilman et al. | |
| 2010/0114654 A1 | 5/2010 | Lukose et al. | |
| 2010/0131563 A1 | 5/2010 | Yin | |
| 2010/0169304 A1 | 7/2010 | Hendrickson et al. | |
| 2010/0235313 A1 | 9/2010 | Rea et al. | |
| 2011/0113447 A1 | 5/2011 | Jung | |
| 2011/0191372 A1 | 8/2011 | Kaushansky et al. | |
| 2011/0213655 A1 | 9/2011 | Henkin | |
| 2012/0036007 A1 | 2/2012 | Robertson et al. | |
| 2012/0116868 A1 | 5/2012 | Chin et al. | |
| 2012/0158489 A1 | 6/2012 | Benyamin et al. | |
| 2012/0203584 A1 | 8/2012 | Mishor | |
| 2012/0215625 A1 | 8/2012 | Ramer et al. | |
| 2012/0246033 A1 | 9/2012 | Keiser | |
| 2012/0246054 A1 | 9/2012 | Sastri et al. | |
| 2012/0290340 A1 | 11/2012 | Ramanujam et al. | |
| 2012/0290938 A1 | 11/2012 | Subbarao et al. | |
| 2012/0296845 A1 | 11/2012 | Andrews et al. | |
| 2013/0080264 A1 | 3/2013 | Umeda | |
| 2013/0103385 A1 | 4/2013 | Ghosh et al. | |
| 2013/0124653 A1 | 5/2013 | Vick | |
| 2013/0132851 A1 | 5/2013 | Konopniki et al. | |
| 2013/0166379 A1 | 6/2013 | Ehindero et al. | |
| 2013/0238356 A1 | 9/2013 | Torrii | |
| 2013/0246430 A1 | 9/2013 | Szucs et al. | |
| 2013/0263019 A1 | 10/2013 | Castellanos et al. | |
| 2013/0311323 A1 | 11/2013 | Stoll et al. | |
| 2013/0339126 A1 | 12/2013 | Cui et al. | |
| 2014/0025749 A1 | 1/2014 | Glowacki | |
| 2014/0025758 A1 | 1/2014 | Glowacki | |
| 2014/0056526 A1 | 2/2014 | Scipioni | |
| 2014/0136323 A1 | 5/2014 | Zhang et al. | |
| 2014/0188897 A1 | 7/2014 | Baker et al. | |
| 2014/0254454 A1* | 9/2014 | Calcev | H04W 48/20 370/312 |
| 2014/0337320 A1 | 11/2014 | Hernandez et al. | |
| 2015/0106304 A1 | 4/2015 | Gupta et al. | |
| 2015/0112753 A1 | 4/2015 | Suvarna | |
| 2015/0186790 A1 | 7/2015 | Ehlen et al. | |
| 2016/0087933 A1* | 3/2016 | Johnson | H04W 4/70 709/245 |
| 2017/0109141 A1 | 4/2017 | Thomas et al. | |
| 2017/0148038 A1 | 5/2017 | Thomas et al. | |
| 2017/0243125 A1 | 8/2017 | Thomas et al. | |
| 2017/0300564 A1 | 10/2017 | Feng et al. | |
| 2017/0315996 A1 | 11/2017 | Fothergill | |
| 2018/0165706 A1 | 6/2018 | Feng et al. | |

FOREIGN PATENT DOCUMENTS

| | | |
|---|---|---|
| WO | 2013101812 | 7/2013 |
| WO | 2013158790 | 10/2013 |
| WO | 2013158840 | 10/2013 |
| WO | 2013177230 | 11/2013 |
| WO | 2014143018 | 9/2014 |

OTHER PUBLICATIONS

Rosa et al., Smart Composition of Reusable Software Components in Mobile Application Product Lines, ACM, 2011, pp. 45-49.

Sung et al., Mobile Application Development Classes for the Mobile Era, ACM, 2014, pp. 141-146.

Kirk, M., Thoughtful Machine Learning: A Test-Driven Approach, O'Reilly Media, Inc., Ch. 4, Naïve Bayesian Classification, 2014.

Bharat et al., Building Distributed, Multi-User Applications by Direct Manipulation, ACM, 1994, pp. 71-81.

Koziokas et al., Usability Testing of Mobile Applications: Web vs. Hybrid Apps, ACM, 2017, pp. 1-2.

Meskens et al., Plug-and-Design: Embracing Mobile Devices as Part of the Design Environment, ACM, 2009, pp. 149-153.

Yang et al., Personalized Mobile Application Discovery, ACM, 2014, pp. 49-54.

Zhan et al., MCKit: A Mobile App for Conferences, ACM, 2014, pp. 59-64.

* cited by examiner

IRC-INFOID DATA STANDARDIZATION FOR USE IN A PLURALITY OF MOBILE APPLICATIONS

BACKGROUND

1. Field

This invention relates to the field of data archival standardization for cross-platform communication, transfer and usability improvement of collected data for usage optimization and institutional training.

2. Related Art

Various systems, from social networks to large data providers to large content delivery networks (CDN) use tools that work in a vast interconnected eco-system that generates vast amounts of data.

The size and scale of the data transferred between these systems is enormous—but there is no unifying language or standard to connect it, meaning that every new tool and every new product requires a great and expensive investment for capturing, compiling, processing and using the relevant data.

Keeping track of, continuously updating, and actually training users on these complex data systems for them to find and use the collected data is exceptionally onerous or nearly impossible.

The rising cost of storing and transferring this data and data mining for use by the common user who needs it, requires an optimized architecture that does not exist today. It is currently the realm of experts that limits the use of data collected. The need for expert guidance for each implementation stifles the possibility of growth.

Most of the data is used today in a one-way transfer mode, where search queries look for key words. The state of the data—on line/off line; local/remote etc. plays a major role in the access to data.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments of the invention provide a standardized frame work that enables transfer of data across a plurality of systems and enable the user to search, capture and use the relevant data from the collected and stored data systems efficiently and easily.

In accordance with aspect of the invention, an object-oriented data management system is disclosed, that may be implemented in the cloud, that includes memory for storing data; and a processor operatively coupled to the memory, the processor comprising an IRC-Infoid Engine that creates and manages standardized IRC-Infoid data structures, wherein the standardized IRC-Infoid data structure comprises information, processing-rules, and an atomic-action layer, enabling functions to operate across disparate-systems using data-definitions.

The standardized IRC-Infoid may be defined by properties, wherein the properties comprise event, user, file, message, data and relationship. The properties follow inter-relationship rules to force internal consistency, data optimization, and maintain data integrity of the standardized IRC-Infoid data.

The standardized IRC-Infoid data structure may comprise documentation, thought leadership and chatter, which when parsed through rule sets, gets attached to standard or triggered actions.

The IRC-Infoid Engine may further validate internal consistency of rules.

The system may further include an IRC-Infoid Runner operatively coupled to the IRC-Infoid engine, wherein the IRC-Infoid Runner exposes application program interface (API) endpoints for create, read, update, and delete (CRUD) and batch import and export of data. The IRC-Infoid Runner may be coupled to at least one of: social networking websites, cloud storage facilities, and other data storage facilities. The IRC-Infoid Runner may include an authentication and create, read, update, and delete (CRUD) module that exposes the API end points to websites, social media sites and external data storage systems. The authentication and CRUD module may enable the Infoid Runner to authenticate itself with the websites and social media sites to enable extraction and import of data and information from the websites, social media sites, and external data storage systems and export the standardized data as IRC-Infoids.

The system may further include a user Infoid group coupled to the IRC-Infoid Runner, wherein the user Infoid group comprises stored user preferences Infoids of users of the system.

The system may further include a structural standardization module to check the structural integrity and standard format of any collected and compiled data and information.

The system may further include a rule conformity check and verification module to check the standardized data and information sets to see that they are conform to the set of rules established for the data structures for the users.

The system may further include a user interface that comprises a user request input module and a user response module.

In accordance with another aspect of the invention, a computerized method for object-oriented data management is disclosed that includes defining a construct and structure of a standardized IRC-Infoid; generating a structurally standardized data model of the IRC-Infoid, wherein generating the structurally standardized data model comprises defining structural standardization checks, rule checks and verification checks; instantiating an Infoid system with an the Infoid processing engine comprising an Infoid runner, an authentication module, a standardization check module, a rule check module, a linkage to a user interface, and a user Infoid group which is further linked to links to user preference Infoid modules and to a user data store for storing user data sets; using the authentication module, the Infoid runner authenticates itself with websites, social media sites and data stores; and using the structured data model, the Infoid runner establishes capability to convert disparate data streams that may be accessed by the Infoid runner to a standardized structured form as a IRC-Infoid structure, wherein the Infoid runner parses the data to extract relevant information and converts the collected relevant data using the set of rules established for the standardized and structured data.

The standardized structured relevant data may include relationship information, time constraints, actions, internal support documentation, and actual constraints of the data storage structure.

The method may further include once the structure of the collected data is finalized, establishing a set of rules that check and verify the consistency of the data structure within a checker module, wherein the set of rules ensure data integrity, security and valuation of the structured Infoid data set. The rules may include data integrity rules, structural conformity and structural integrity rules, self-depreciation rules, permission rules and access control, and valuation rules.

The method may further include accepting user inputs and based on the user inputs, accessing and collecting data and information from the websites, social media sites and data stores to generate and store the generated IRC-Infoids in the User data set.

The method may further include generating user preference IRC-Infoids for users of the system. Generating user preference IRC-Infoids for users of the system may include identifying approved users of the system; collecting user level of access to the data and determining security status of individual users for each identified user of the system; collecting user preferences; compiling a user profile for each individual user; inputting the user profiles for each of the individual users who are allowed to access the system into the Infoid runner; formatting the input user profiles to produce a nested IRC-Infoid of the profile for each of the individual users; checking the IRC-Infoid to ensure that the IRC-Infoid conform to the structure of the Infoids using the structure standardization checker module; checking the IRC-Infoid for conformity to the rules of the Infoids using the rules conformity check and verification module; and saving and linking the checked IRC-Infoids of the individual users to an individual user IRC-Infoid data-store as part of a user Infoid group and the data set in the IRC-Infoid Data store within the Infoid system.

The method may further include collecting data and converting the data into the standardized IRC-Infoid format, and saving the converted data.

The method may further include generating the user preference-related data in the standardized form of IRC-Infoids. Generating the user preference-related data in the standardized form of IRC-Infoids may include authenticating an Infoid runner with websites and data storage units prior to engaging with the websites and data storage units; checking user preferences saved in user preference IRC-Infoid locations to determine if any changes have been made by an Infoid engine; checking the web sites and data storage units to find information data and supporting documentation matching the user preferences; pulling the identified information and data available in a plurality of formats from the web sites and data storage units matching the user preferences for processing them to a standardized format; converting the information, data and supporting documentation collected into the standardized form of the IRC-Infoid; checking the IRC-Infoid for structural integrity; checking the IRC-Infoid for conformity to the rule set of the IRC-Infoid standard; and storing the checked and verified information and data as linked IRC-Infoids in a data store as individual user IRC-Infoids with any related documentation.

The method may further include updating the stored user specific IRC-Infoids with information and data pulled from the connected websites and data storage units to keep the information current.

BRIEF DESCRIPTION OF DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

An object-oriented data management method and system comprise nested structural-elements that form inter-related containers of Infoids (IRC-Infoids), that includes information, processing-rules, and an atomic-action layer, enabling functions to operate across disparate-systems using data-definitions is disclosed. The name Infoid as described herein is conceptual wrapper for a data object and not the data itself. The creation and management of the IRC-Infoid objects, rules and actions are handled by an "IRC-Infoid Engine". The IRC-Infoid is an object with its own definitions, properties, and rules, related to a single parent element. Six properties define IRC-Infoid: event, user, file, message, data and relationship. These properties follow inter-relationship rules, which force internal consistency, data optimization, maintain data integrity. The IRC-Infoid data structure includes documentation, thought leadership and chatter, which when parsed through the rule sets, gets attached to standard or triggered actions, including periodic updates and called actions for use across the disparate-systems.

Basics of Disclosure

Figure 1:
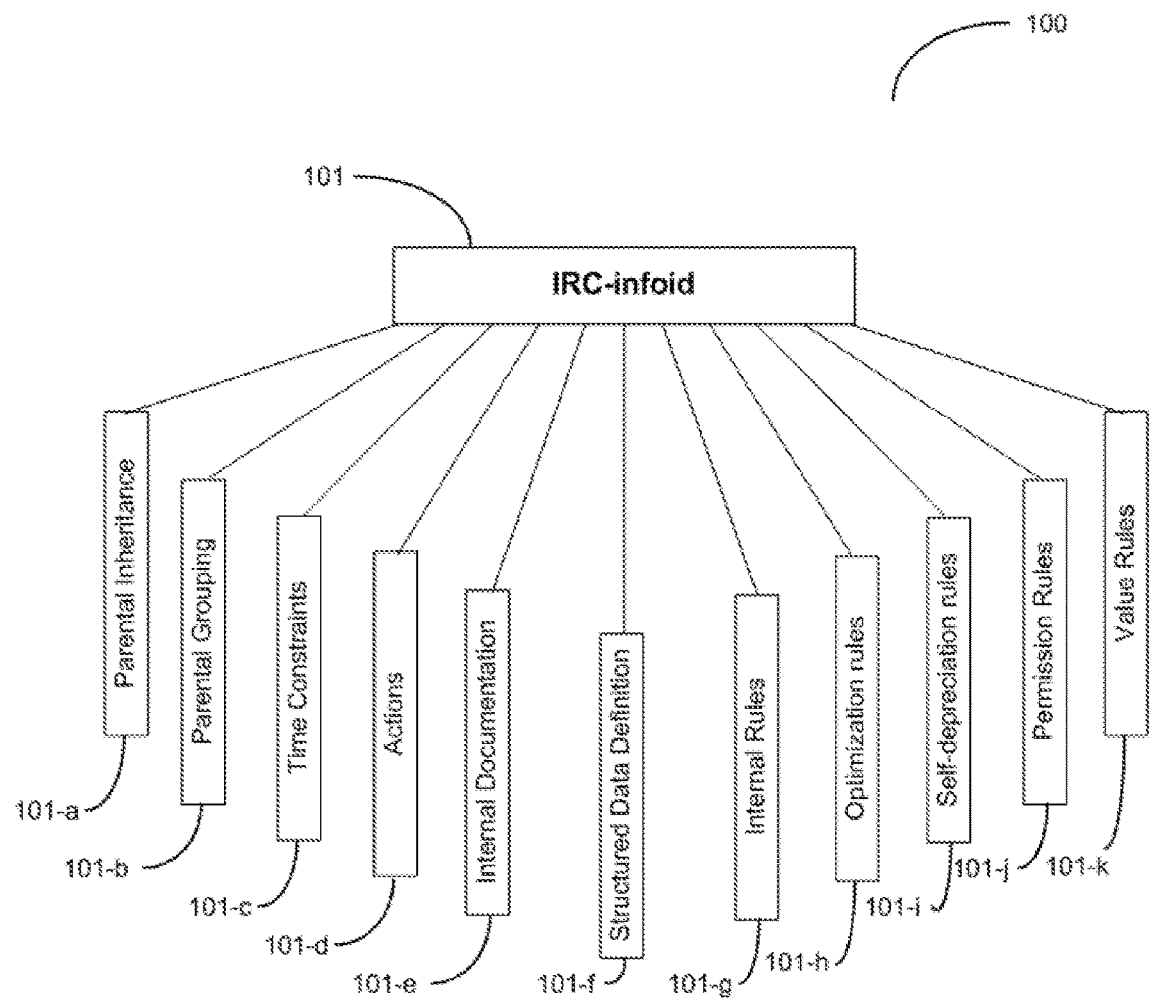
FIG. 1 is an exemplary graphic property definition of the standardized IRC-Infoid with its data structure, linkages, constraints and rules in accordance with one embodiment of the invention.

The typical IRC-Infoid steps for generation and operation are:

A team architects the general outlines of products or services and defines the construct of inter-related container of Infoids (IRC-Infoid)s;

The team uses an IRC-Infoid engine, using a what you see is what you get (WYSIWYG) or a structured data model, to create a set of IRC-Infoids having a structured data definition;

The structural definition of the IRC-Infoids shown in FIG. 1 contain property definitions for the following:

Parental inheritance 101-*a*: (all the properties of a generated IRC-Infoid may derive from a parent IRC-Infoid).

Parental Grouping 101-*b*: (Is the generated IRC-Infoid that forms part of a larger set of IRC-Infoids).

Time constraint 101-*c*: An IRC-Infoid can have a start and an end time.

Actions 101-*d*: their (optional) triggers and counters (a counter is a trigger that happens after x triggers in y time)

Internal Documentation 101-*e*: Triggered (depending on other field values) and non-triggered notes, data, links, users and comments are made an underlying part of the IRC-Infoid generated.

Structured Data Definition 101-*f*: (the actual information to be contained in the IRC-Infoid)

Internal Rules 101-*g*: (The generated IRC-Infoid conform to rules that enable data integrity).

Optimization Rules 101-*h*: help create an Optimum structure for the IRC-Infoid for use.

Self-depreciation Rules 101-*i* (definition of staleness and time to live) enabling removal of out of date Data.

Permission Rules—define the characteristics and type of users who can access and use the data.

Value Rules (gamification/valuation set)

The IRC-Infoid Engine validates internal consistency of rules;

An IRC-Infoid Runner associated with the IRC-Infoid engine exposes application program interface (API) endpoints for create, read, update, and delete (CRUD) and batch import and export of data;

The IRC-Infoid Runner schedules and listens for actions;

The IRC-Infoid Runner can be configured to connect to outside services to complete actions;

Documentation can be added initially or longitudinally over time, but will involve support from every aspect of the system organization;

The dimensionality of IRC-Infoid documentation can be reduced, allowing it to be exposed as flat, or hierarchical and it can be exposed to outside tools in order to express it as in-line or even Wizard-like user support, leading to artificial intelligence (AI)-level implementations;

Once IRC-Infoid is created, rules are implemented, documentation developed, and actions enabled, the IRC-Infoid becomes the core data structure and data processing capability for any application.

Description

The inter-related container of Infoids (IRC-Infoid)s is a structural construct that defines the IRC-Infoid as a conceptual wrapper for a data object. The use of the IRC-Infoid enables the standardization of data from a multitude of disparate data sources to be optimized for transfers of data between a plurality of use systems. The IRC-Infoid provides a generic platform for the transfer and processing of disparate kinds of data from the multitude of disparate data sources and data mining engines that already exist in the cloud and communication universe. The structural construct is able to account for infinite data input and output mechanisms and types that exists today and is growing in number. The IRC-Infoid is able to provide methods for integration of content, by parsing streams of data to extract required content, based on user profiles established, for conversion to achieve the desired results. IRC-Infoid construct is able to outline specific non-abstract properties for said transfer and create easy mechanisms for the data transfer between the disparate use systems by standardization of the structure and properties of the underlying data types and data structures.

An object-oriented data management method and system comprised of nested structural elements, the IRC-Infoid which is conceptual wrapper for a data object, specifying processing rules, and an atomic action layer, enabling business functions to travel across disparate systems using abstracted data definitions is disclosed. The IRC-Infoid is a semantically rich object consisting of its own definitions, properties, and rules, related to a single parent element and several underlying layers of information and data, some of it may be as nested IRC-Infoids. The IRC-Infoid properties are optimized around six primitive data types: event, user, file, message, data and relationship. The IRC-Infoid is able to exposes the appropriate properties on request. In order to maintain data integrity and structure, the properties include relationship rules that may be inherited as nested IRC-Infoids, properties and constraints which force internal consistency as well as data optimization. Once an IRC-Infoid is created and parsed through the rule sets, it can be attached to standard or custom triggered actions, including periodic updates and called actions. (The underlying data or information include documentation, thought leadership, chatter). Triggered actions can be periodic, firehose or called, recognizing changed data and reacting accordingly. Periodic actions use and or update IRC-Infoid data at regular intervals, and called actions are manually triggered by outside systems or calls. The creation and management of these objects, rules and actions will be handled in the system by an "IRC-Infoid-Engine."

The rapid spread of social media with public participation has created a situation where the generated data volume over any time period is enormous. There are a large number of systems that try to monitor and collect the data passing over the social systems for use. There are also a large number of storage systems that store the data with the hope of generating useable data groupings from the volume of data collected and stored. But so far there has not been a consorted effort at a standardized format that will enable data from any one system to be used by all other systems or users. This limits the usefulness of the data collection by limiting the availability of data for usage and also makes institutional training for usage very complex and difficult.

Embodiments of the disclosed invention associate the data to a standardized format that enable transfer, storage, search and use of data across the plurality of systems. The standardized format helps to make the data available for use effectively to institutions and users for analysis and use. Such a system will also facilitate ease of institutional training for optimized data usage.

What is further disclosed is a system that understands a user's preferences and requirements and pushes any relevant data to the user when and if such data is updated in a system. By associating and using a standardized format that links the generated Infoids to data details, the data from any system can be extracted by the Infoid-Engine and provided to the user or consumer for information and action.

Detailed Description

Figure 2:
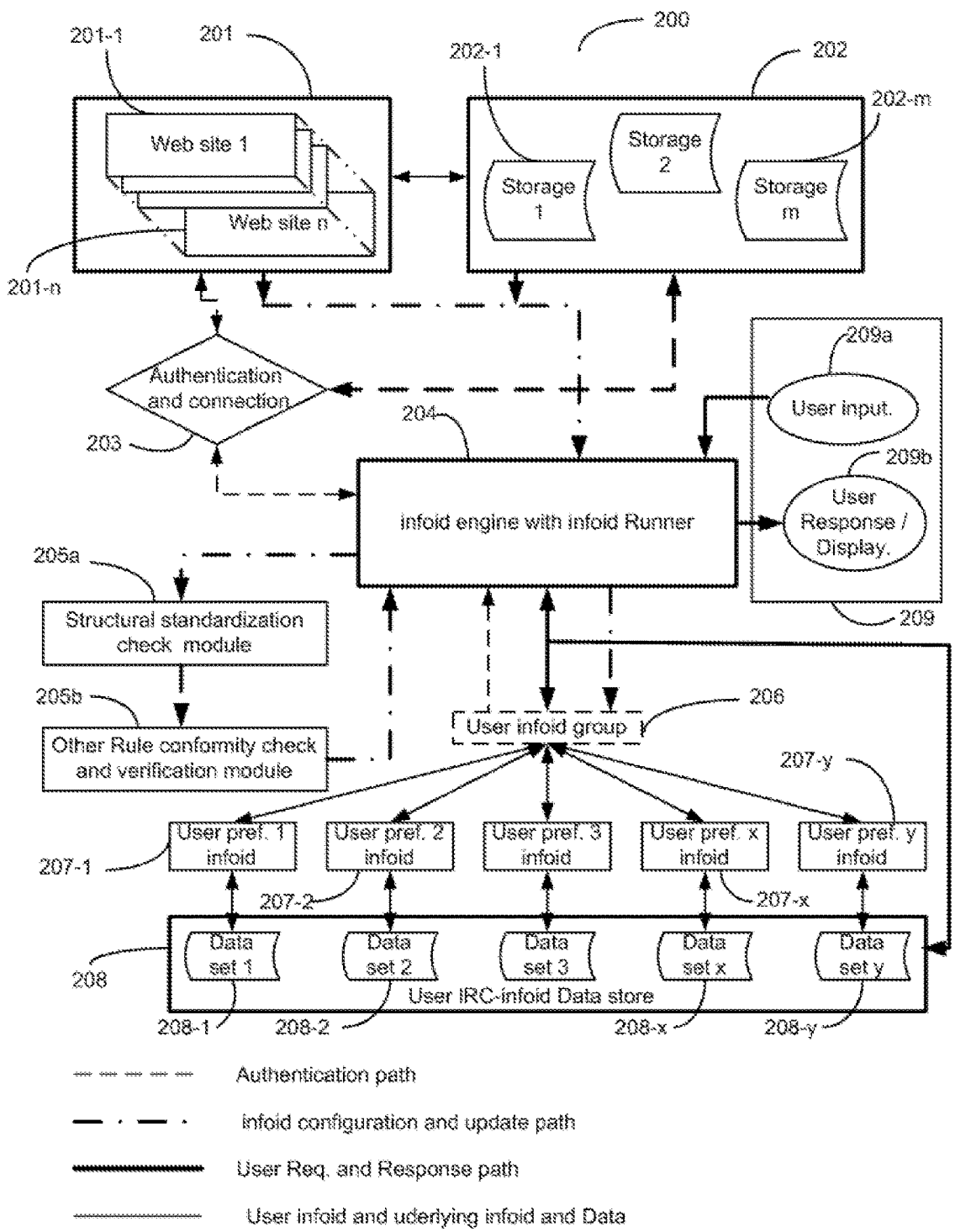
FIG. 2 is an exemplary embodiment of the IRC-Infoid system of the current invention comprising an Infoid processing engine (Infoid runner) for collecting, compiling, storing and linking the data in a standardized form, and delivering the data to user in accordance with one embodiment of the invention.

FIG. 1 shows an exemplary structure and rule set of the inter-related container of Infoid (IRC-Infoid) and FIG. 2 shows the system for implementing the standardized IRC-Infoid. The block diagram 200 of IRC-Infoid system comprise an IRC-Infoid runner 204 that is coupled to all the social networking websites 201 and cloud and other data storage facilities 202.

The Infoid system comprises an Infoid runner 204 that is linked to a set of web sites/social media sites 201 (201-1 to 201-*n*) and to data storage system in the cloud 202 (202-1 to 202-*m*) that extract information from data streams and store them. An authentication and create, read, update, and delete (CRUD) module 203 coupled to the Infoid runner 204 exposes API end point to the web/social media sites and cloud. The authentication and CRUD module 203 enables the Infoid runner to authenticate itself with the web/social media sites 201 to enable extraction and import of data and information from the web/social media 201 and external data storage systems 202 as well as export the standardized data as IRC-Infoids to the cloud based systems web sites and other users outside the system 200. The Infoid runner is further connected to a user Infoid group 206 which comprise stored user preferences Infoids 207 (207-1 to **207-*y*) of all of the users of the system 200. These user preference Infoids 207 are also sets of IRC-Infoids which get updated whenever the user accesses the system. The storage 208 associated with the User IDs 207 comprise all the data and information in data sets 208-1 to 208-*y* associated with each user of the system. A structural standardization module 205***a* is used to check the structural integrity and standard format of any collected and compiled data and information. The structural standardization module 205*a* is used to ensure that data collected is modified to conform to the standard structural constraints setup as shown in FIG. 1. A rule conformity check and verification module 205*b* checks the standardized data and information sets to see that they are conform to the set of rules established for the data structures for the users. A user interface 209 comprise a user request input module 209*a* and a user response module 209*b* completing the essential modules of the Infoid system 200.

Figure 3:
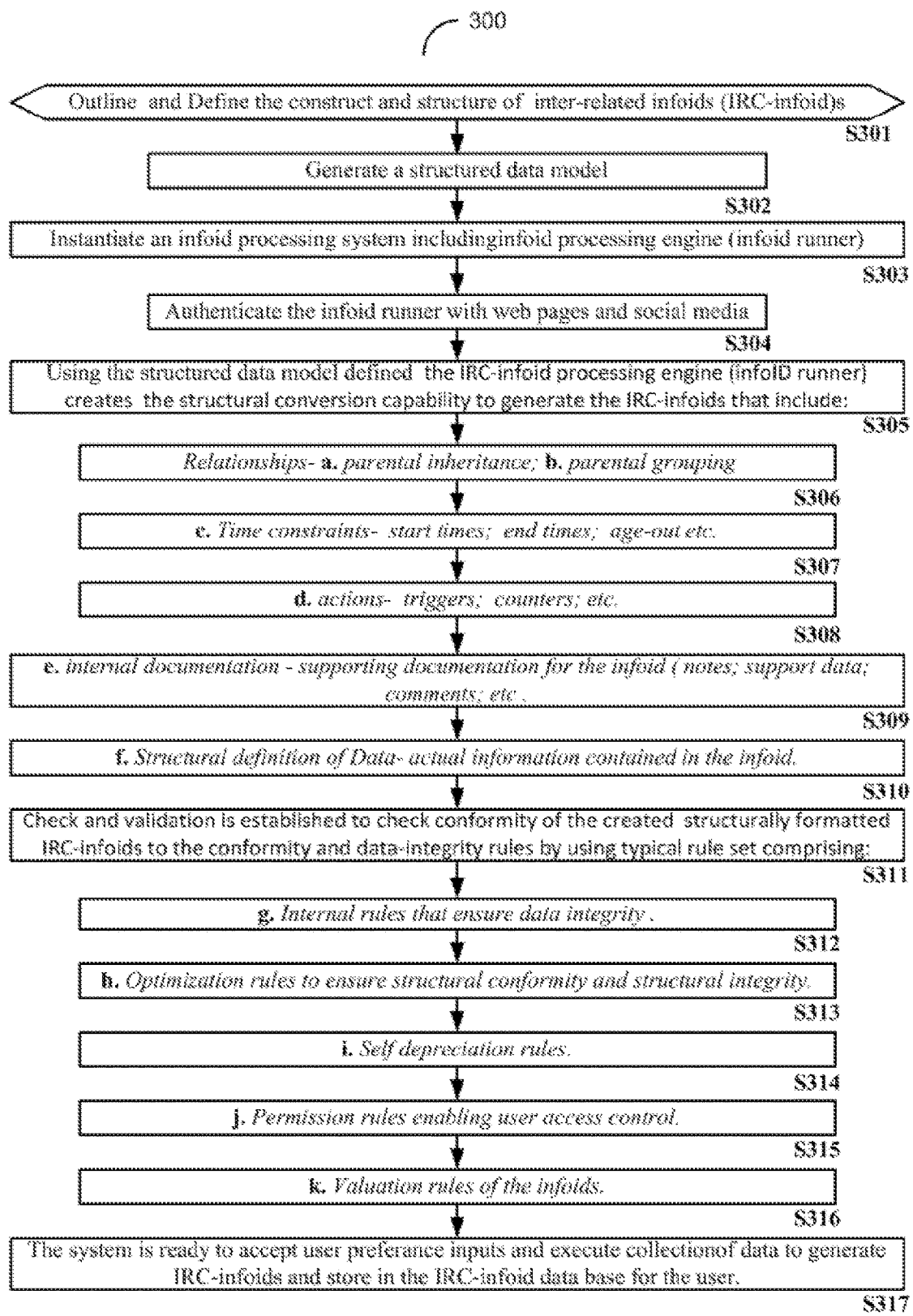
FIG. 3 is an exemplary flow chart of the initial setup of the system to enable the use of IRC-Infoid as a conceptual wrapper for a data object in accordance with one embodiment of the invention.

FIG. 3 is a flow chart of the setup of the system 200 for establishing the Infoid based standardized data access for data from and supplying data to disparate systems having a plurality of data structures. A typical and exemplary set up of the Infoid system 200 is as follows:

The construct and structure of the Infoid is defined with all associated information as shown in FIG. 1 (block S301).

A structurally standardized data model of the IRC-InfoID is generated with all structural standardization checks and rule checks and verification checks defined (block S302).

The Infoid system 200 is instantiated with all necessary components: the Infoid processing engine (Infoid runner) 204, the authentication module 203, the standardization check module 205*a*, the rule check module 205*b*, and linkages to user interface 209 comprising user request input devices 209*a* and user display devices 209*b*, the User Infoid group 206 which is further linked to links to the user preference Infoid modules 207-1 to **207-*y* and to the user data store 208 for storing user data sets 208-1 to 208-*y* (block S303**).

Using the authentication module 203, the Infoid runner 204 authenticates itself with the web sites, social media and the data stores over the cloud (block S304).

Using the structured data model defined in block S302, the Infoid runner establishes capability to convert disparate data streams that may be accessed by the Infoid runner to a standardized structured form as an IRC-Infoid structure. This is done by parsing the data to extract relevant information and converting the collected relevant data using the set of rules established for the standardized and structured data. The aim is to associate the data to the standardized format that enables transfer, storage, search and use of data across the plurality of systems (block S305).

The typical standardized structured relevant data will include:

Relationship information: inheritance rules such as parental information and parental grouping, which relate the current data to the background of the stream where available (block S306).

Time constraints: the time from which the data may be valid, or start times; the time to which the data is valid or end times; time duration after which the data has to be refreshed or periodicity of updates, the time duration after which the data has to be discarded or age out etc. (block S307).

Actions: IRC-Infoid data structure can be linked to actions that are necessary to be completed (block S308); these actions can be initiated by triggered or counters.

Internal support documentation: this can include background information, support documents, comments, tweets etc. which enhance and explain the data collected and stored (block S309).

The actual constraints of the data storage structure: this allows the data to be stored in interconnected containers of IRC-Infoids; each set linked to the top level of IRC-Infoids to enable access and retrieval and use of the data collected and organized in the IRC Infoid structured format (block S310).

Once the structure of the collected data is finalized a set of rules are also established that check and verify the consistency of the data structure within a checker module 205*a*. Rules are also established that ensure data integrity, security and valuation of the structured Infoid data set these are instantiated as part of the module 205*b* (block S311).

These rules typically comprise:

Rules that check for data integrity: these rules will assess and make sure that the integrity of the data is maintained through the parsing and re-construction operation by the Infoid runner (block S312).

Rules of structural conformity and structural integrity: these rules are established based on the IRC-Infoid structure, to ensure that the data structure of the data set generated conforms to the structured data model and its components, in the IRC-Infoid (block S313).

Self-depreciation rules: these rules are a check for the time based components of the data that are part of the construct. These rules make sure the IRC-Infoid follows the constraints of time limitations set for the IRC-Infoid data set being generated (block S314).

Permission rules and access control: these rules define the security of the data generated and stored by enabling permission levels for user access control (block S315).

Valuation rules of the IRC-Infoid: this sets the hierarchical importance of the data collected and stored for any user based on assessed importance to the user; the importance is assessed based on the user frequency of data access and other user preferences set (block S316).

The setup of the Infoid system 200 is completed once these steps are complete the system is now ready to accept user inputs and based on such preference data access and collect data and information from the web/social media sites and generate and store the generated IRC-Infoids in the User data set (block S317).

Once the setup is completed, the user information has to be setup and user permissions and user profiles have to be established to enable the operation of the system. The user information with user permissions are input into the system, which allows the system to set up user accounts and also provide the Infoid runner to establish the necessary checks for enabling user access. A set of user profiles 207-1 to **207-*y* of the plurality of users of the system are then input into the system via the user input 209***a* of the user interface 209. The Infoid runner 204 is used to convert the input into a set of User preference IRC-Infoids 207-1 to **207-*y*. These user profile IRC-Infoids are checked to verify the consistency of the data structure using the checker module 205***a*. The user preference IRC-Infoids 207-1 to **207-*y* are also checked to ensure data integrity, security and valuation of the user Preference Infoid 207-1 to 207-*y*** using the checker module 205*b*. The checked and verified user preference IRC-Infoids are saved as part of user Infoid group 206. The individual user profile related IRC-Infoids saved are linked to the data sets 208-1 to 208-*y* relating to the individual users of the system in the IRC-Infoid data-store 208.

Figure 4:
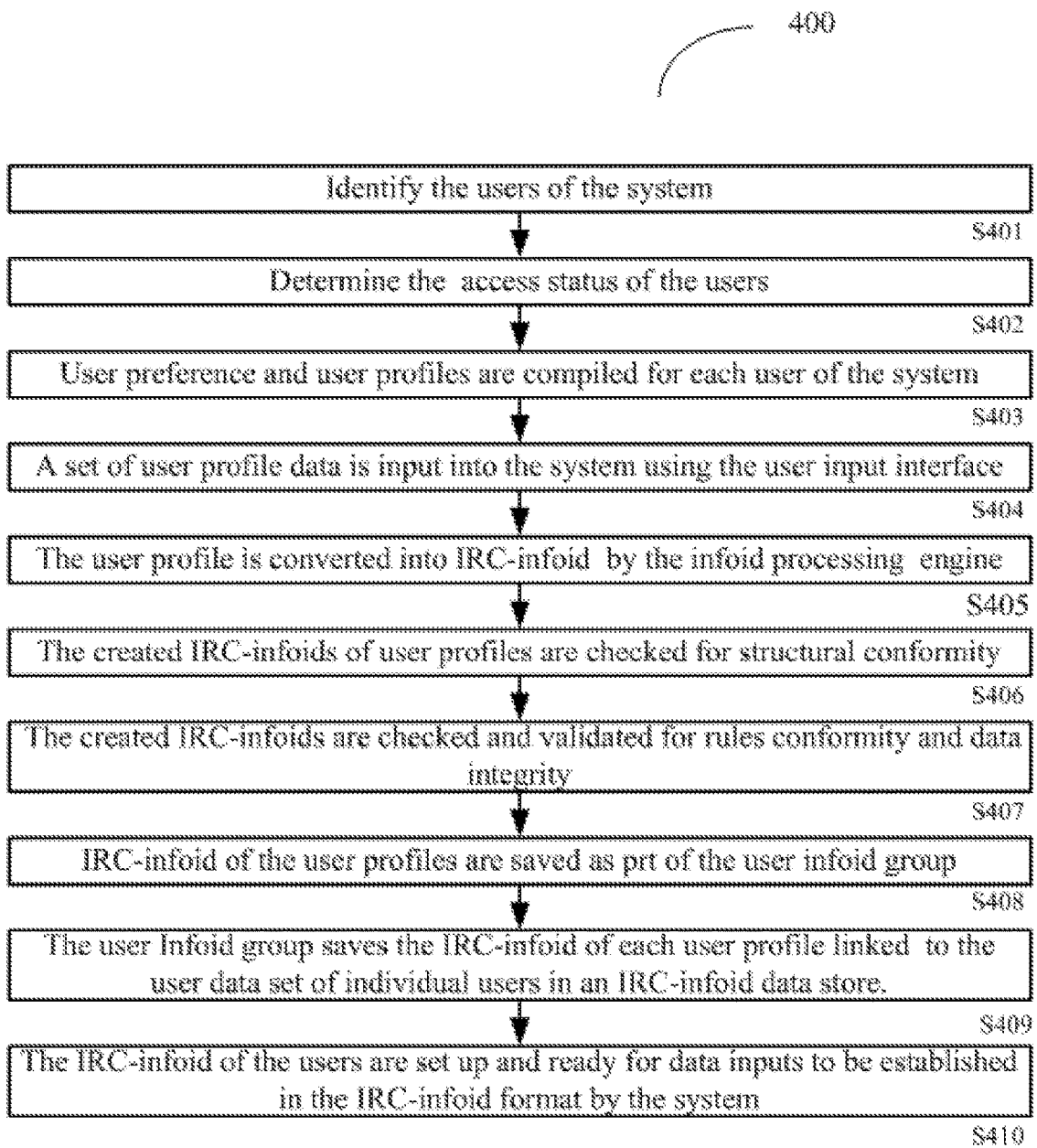
FIG. 4 is an exemplary flow chart of the initial input of the user preferences into the typical Infoid system in accordance with one embodiment of the invention.

FIG. 4 shows a typical and exemplary flow chart of the generation of the User preference IRC-Infoids for users of the system.

All the approved users of the system are identified (block S401).

The user level of access to the data collected and security status of the individual user is determined for each user of the system who has been identified (block S402).

The User preferences are collected and a user profile is compiled for each user (block S403).

The user profiles for the plurality of users who are allowed to access the system are input into the Infoid Processing unit (Infoid runner) within the system through the user input in the user interface of the system (block S404).

The Infoid Processing unit (Infoid runner) accepts the user profiles, formats the input to produce a nested IRC-Infoid of the profile for each user of the system (block S405).

The Created IRC-Infoid of profiles of the users are checked to ensure that the IRC-Infoid of user profile generated conform to the structure of the Infoids using the structure standardization checker module (block S406).

The set of IRC-Infoids of user profiles are also checked for conformity to the rules of the Infoids using the rules conformity check and verification module (block S407).

The checked and verified IRC-Infoid of the user profile of the individual users are saved linked to the individual user IRC-Infoid data-store as part of a user Infoid group (block S408).

The saved IRC-Infoid profile of the individual user is further linked to the data set in the IRC-Infoid Data store within the Infoid system (block S409).

The system is now ready to collect save and retrieve usable data in the standardized IRC-Infoid format for each user of the system (block S410).

To enable the system 200 to work as a data collection and standardization system suited for the user applications—data available has to be collected and converted in the standardized IRC-Infoid format and saved. The data collected has to be related to the users of the system. In order to do that the Infoid runner goes out and searches the social networking websites 201 and the data stores 202 to identify data that is related to the user preferences Infoids 207-1 to 207-*y* under the user Infoid group 206. The IRC-Infoid runner 204 then captures the relevant data identified and pulls it into the system 200. Once captured, the data is parsed and processed to bring it into a pre-defined construct and structure of inter-related Infoids (IRC-Infoid)s, shown in FIG. 1 by the Infoid runner 204. The generated IRC-Infoid of the data are checked for structural integrity and conformity by the structural standardization module 205*a*. The IRC-Infoids of data generated are also checked for conformity to the rules of the IRC-Infoid using the rule conformity check and verification module 205*b*.

Once the data, information and support documentation have been converted to the standardized format of IRC-Infoids and saved, the data, information and supporting documents can be made available to the users by pushing the data on to the user devices or by the user applications pulling the relevant data as they need or as they become available. Since the data is in a standardized format of IRC-Infoid, it is also easy to transfer the data from a user to other users within the IRC-Infoid system 200 and to other users outside the system using alternate formats for data and information.

Figure 5:
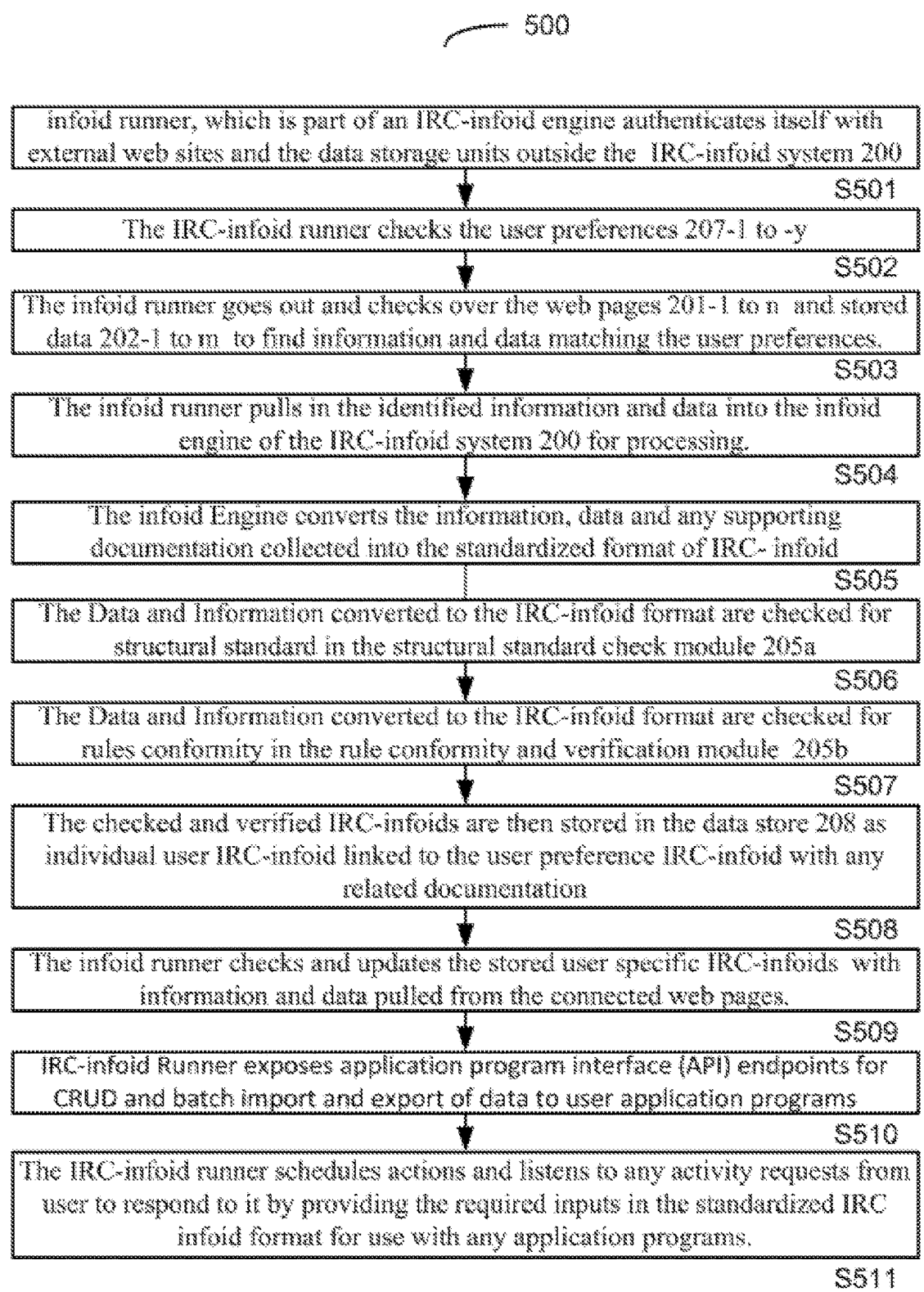
FIG. 5 is a flow chart of the manipulation of the collected data into a standardized IRC-Infoids having a structural format, definition and support Infoid structure in accordance with one embodiment of the invention.

FIG. 5 is a flow chart 500 of the generation of the user preference related data in the standardized form of IRC-Infoids 208-1 to 208-*y* for easy use in Applications of the users and transfer to others by the users of the IRC-Infoid system 200.

The Infoid runner, which is a part of an IRC-Infoid engine is used to authenticates itself with the web sites and the data storage units prior to engaging with these websites and data storage engines. The authentication provides the Infoid runner the ability to access the available information and data within the web sites 201-1 to n and the data stores 202-1 to m (block S501).

The IRC-Infoid engine checks the user preferences saved in the user preference IRC-Infoid locations 207-1 to y to determine if any changes have been made (block S502).

The Infoid runner then goes out and checks the web pages 201-1 to n and stored data 202-1 to m to find information data and supporting documentation that matches the preferences indicated and saved by the various users of the IRC Infoid system 200 (block S503).

Infoid runner pulls into the Infoid engine the identified information and data, available in a plurality of format from the web and data stores, matching the user preferences for processing them to a standardized format (block S504).

The Infoid Engine using the processing power available within it converts the information, data and any supporting documentation collected into the standardized format of IRC-Infoid (block S505).

The Data and Information converted to the IRC-Infoid format by the Infoid engine are checked for structural integrity in the structural standard check module 205*a*. The structural standard check module checks the IRC-Infoids for conformity to all the constraints and structural data definition of the IRC-Infoid established (block S506).

The IRC-Infoid generated are also checked for conformity to the rule set of the IRC-Infoid standard 101 in the rule conformity and verification module 205*b* (block S507).

The checked and verified information and data as linked IRC-Infoids are then stored in the data store 208 as individual user IRC-Infoids with any related documentation. The stored Infoids are also linked to the user preference IRC-Infoid for access and update (block S508).

The Infoid runner on a regular basis goes out and checks and updates the stored user specific IRC-Infoids with information and data pulled from the connected web pages to keep the information current. The aged data and information are also purged from the store based on the rules established for the IRC-Infoid 101 on a regular basis (block S509).

IRC-Infoid Runner is enabled to expose application program interface (API) endpoints for create, read, update and delete (CRUD) and batch import and export of data to user application programs (block S510).

The IRC-Infoid runner also schedules actions and listens to any activity requests from user via the user interface of the IRC-Infoid system 200, to respond to it by providing the required outputs in the standardized IRC-Infoid format for use with any application programs or for direct use by the user of the data (block S511).

The embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture.

Preferably, the machine is implemented on a computer platform having hardware such as one or more central processing units ("CPUs"), one or more memories, and one or more input/output interfaces. The computer platform may also include an operating system and micro-instruction code. The various processes and functions described herein may be either part of the micro-instruction code or part of the application program, or any combination thereof, which may be executed by a CPU, whether or not such computer or processor is explicitly shown. In addition, various other peripheral units may be connected to the computer platform such as an additional data storage unit and a display unit.

Although a number of possible implementations have been mentioned, these are presented merely for the sake of explanation and teaching, and are not limitative. Moreover, an implementation of an apparatus that falls within the inventive concept does not necessarily achieve any of the possible benefits outlined above: such benefits are dependent on the specific use case and specific implementation, and the possible benefits mentioned above are simply examples.

Although the concepts have been described above with respect to the various embodiments, it is noted that there can be a variety of permutations and modifications of the described features by those who are familiar with this field, only some of which have been presented above, without departing from the technical ideas and scope of the features, which is defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward data units in the manner described in the present disclosure with respect to various embodiments.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention has been described in relation to particular examples, which are intended in all respects to be illustrative rather than restrictive. Those skilled in the art will appreciate that many different combinations will be suitable for practicing the present invention. Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A computerized method for object-oriented data management comprising:
    defining a construct and structure of a standardized IRC-Infoid;
    generating a structurally standardized data model of the IRC-Infoid, wherein generating the structurally standardized data model comprises defining structural standardization checks, rule checks and verification checks;
    instantiating an Infoid system with an the Infoid processing engine comprising an Infoid runner, an authentication module, a standardization check module, a rule check module, a linkage to a user interface, and a user Infoid group which is further linked to links to user preference Infoid modules and to a user data store for storing user data sets;
    using the authentication module, the Infoid runner authenticates itself with websites, social media sites and data stores; and
    using the structured data model, the Infoid runner establishes capability to convert disparate data streams that may be accessed by the Infoid runner to a standardized structured form as a IRC-Infoid structure, wherein the Infoid runner parses the data to extract relevant information and converts the collected relevant data using the set of rules established for the standardized and structured data.

2. The method of claim 1, further comprising generating the user preference-related data in the standardized form of IRC-Infoids.

3. The method of claim 2, wherein generating the user preference-related data in the standardized form of IRC-Infoids comprises:
    authenticating an Infoid runner with websites and data storage units prior to engaging with the web sites and data storage units;
    checking user preferences saved in user preference IRC-Infoid locations to determine if any changes have been made by an Infoid engine;
    checking the websites and data storage units to find information data and supporting documentation matching the user preferences;
    pulling the identified information and data available in a plurality of formats from the websites and data storage units matching the user preferences for processing them to a standardized format;
    converting the information, data and supporting documentation collected into the standardized form of the IRC-Infoid;
    checking the IRC-Infoid for structural integrity;
    checking the IRC-Infoid for conformity to the rule set of the IRC-Infoid standard; and
    storing the checked and verified information and data as linked IRC-Infoids in a data store as individual user IRC-Infoids with any related documentation.

4. The method of claim 3, further comprising updating the stored user specific IRC-Infoids with information and data pulled from the connected websites and data storage units to keep the information current.

5. The method of claim 1, further comprising:
    once the structure of the collected data is finalized, establishing a set of rules that check and verify the consistency of the data structure within a checker module, wherein the set of rules ensure data integrity, security and valuation of the structured Infoid data set.

6. The method of claim 5, wherein the rules comprise data integrity rules, structural conformity and structural integrity rules, self-depreciation rules, permission rules and access control, and valuation rules.

7. The method of claim 1, further comprising generating user preference IRC-Infoids for users of the system.

8. The method of claim 7, wherein generating user preference IRC-Infoids for users of the system comprises:
   identifying approved users of the system;
   collecting user level of access to the data and determining security status of individual users for each identified user of the system;
   collecting user preferences;
   compiling a user profile for each individual user;
   inputting the user profiles for each of the individual users who are allowed to access the system into the Infoid runner;
   formatting the input user profiles to produce a nested IRC-Infoid of the profile for each of the individual users;
   checking the IRC-Infoid to ensure that the IRC-Infoid conform to the structure of the Infoids using the structure standardization checker module;
   checking the IRC-Infoid for conformity to the rules of the Infoids using the rules conformity check and verification module; and
   saving and linking the checked IRC-Infoids of the individual users to an individual user IRC-Infoid data-store as part of a user Infoid group and the data set in the IRC-Infoid Data store within the Infoid system.

9. The method of claim 1, wherein the standardized structured relevant data comprises: relationship information, time constraints, actions, internal support documentation, and actual constraints of the data storage structure.

10. The method of claim 1, further comprising:
    accepting user inputs and based on the user inputs, accessing and collecting data and information from the websites, social media sites and data stores to generate and store the generated IRC-Infoids in the User data set.

11. The method of claim 1, further comprising collecting data and converting the data into the standardized IRC-Infoid format, and saving the converted data.

* * * * *